United States Patent
Turover et al.

(10) Patent No.: US 9,021,988 B2
(45) Date of Patent: May 5, 2015

(54) AQUARIUM WITH A SELF-CONTAINED CLEANING APPARATUS

(71) Applicants: David Turover, Chicago, IL (US); Craig Wenger, Chicago, IL (US)

(72) Inventors: David Turover, Chicago, IL (US); Craig Wenger, Chicago, IL (US)

(73) Assignee: Crave Products, Inc., Palatine, IL (US)

( * ) Notice: Subject to any disclaimer, the term of this patent is extended or adjusted under 35 U.S.C. 154(b) by 0 days.

(21) Appl. No.: 13/717,108

(22) Filed: Dec. 17, 2012

(65) Prior Publication Data

US 2013/0152866 A1    Jun. 20, 2013

Related U.S. Application Data

(60) Provisional application No. 61/576,420, filed on Dec. 16, 2011.

(51) Int. Cl.
*A01K 63/04*    (2006.01)
*A01K 63/00*    (2006.01)

(52) U.S. Cl.
CPC ............ *A01K 63/04* (2013.01); *A01K 63/003* (2013.01); *A01K 63/045* (2013.01)

(58) Field of Classification Search
CPC ... A01K 63/003; A01K 63/006; A01K 63/00; A01K 63/04; A01K 63/045; A01K 63/047; A01K 61/00; A01K 61/003
USPC ......... 119/245, 247, 264; 210/167.21–167.26
See application file for complete search history.

(56) References Cited

U.S. PATENT DOCUMENTS

| | | | | |
|---|---|---|---|---|
| 2,636,473 | A | * | 4/1953 | Schwartz et al. ............ 119/264 |
| 3,722,685 | A | | 3/1973 | Orensten et al. |
| 3,785,342 | A | * | 1/1974 | Rogers .......................... 119/259 |
| 3,785,493 | A | * | 1/1974 | Harding ................... 210/167.27 |
| 3,864,261 | A | * | 2/1975 | Masterjoseph ............... 210/163 |
| 4,002,566 | A | * | 1/1977 | Smith ...................... 210/167.13 |
| 4,098,230 | A | | 7/1978 | Jackson |
| 4,512,885 | A | | 4/1985 | Willinger |

(Continued)

FOREIGN PATENT DOCUMENTS

DE   102005030782 A1   1/2007
EP        1321031 A2   6/2003

OTHER PUBLICATIONS

International Search Report and Written Opinion of the International Searching Authority for copending Int'l App. No. PCT/US12/30625.

(Continued)

*Primary Examiner* — Rob Swiatek
*Assistant Examiner* — Danielle Clerkley
(74) *Attorney, Agent, or Firm* — Scherrer Patent & Trademark Law, P.C.; Stephen T. Scherrer; Monique A. Morneault (57) ABSTRACT

The present invention relates to an aquarium cleaning apparatus, systems and methods for removing debris from the aquarium, and in particular, a self-contained cleaning apparatus that utilizes a siphon effect created by pouring water in an aquarium tank and/or pulling water out of an aquarium tank, such as via a vacuum. In a preferred embodiment, the siphon operation occurs because of the difference between the water level of the aquarium tank and the vertical height of a spout attached to the top of a vertical tube. Therefore, it is not necessary for the user to immerse their hands in the aquarium water to operate the cleaning device.

19 Claims, 9 Drawing Sheets

(56) References Cited

U.S. PATENT DOCUMENTS

| | | | |
|---|---|---|---|
| 4,915,828 A | 4/1990 | Meyers et al. | |
| 4,921,614 A * | 5/1990 | Frickman et al. | 210/695 |
| 4,944,248 A * | 7/1990 | Torng | 119/264 |
| 4,957,623 A * | 9/1990 | Henzlik | 210/167.23 |
| 4,978,444 A | 12/1990 | Rommel | |
| 5,098,585 A | 3/1992 | Woltmann et al. | |
| 5,171,438 A | 12/1992 | Korcz | |
| 5,199,378 A | 4/1993 | Kissick | |
| 5,240,596 A | 8/1993 | Chesnut | |
| 5,269,338 A * | 12/1993 | Figas | 137/140 |
| 5,306,421 A | 4/1994 | Weinstein | |
| 5,640,930 A | 6/1997 | Kirby | |
| 5,695,654 A * | 12/1997 | Schultz | 210/780 |
| 6,067,937 A * | 5/2000 | Boschert | 119/247 |
| 6,533,928 B1 | 3/2003 | Terato | |
| 6,706,176 B1 | 3/2004 | Goldman | |
| 6,732,675 B1 * | 5/2004 | Liao | 119/259 |
| 6,755,981 B2 | 6/2004 | Terato | |
| 6,797,163 B2 | 9/2004 | Carley et al. | |
| 6,843,909 B1 | 1/2005 | Woltmann | |
| 7,429,321 B2 | 9/2008 | Willinger | |
| 7,445,706 B2 * | 11/2008 | Liu | 210/167.21 |
| 2006/0225661 A1 * | 10/2006 | Riemma | 119/245 |
| 2007/0051320 A1 | 3/2007 | Yen | |
| 2007/0119381 A1 | 5/2007 | Chang | |
| 2009/0095226 A1 * | 4/2009 | Riemma | 119/245 |
| 2009/0126645 A1 | 5/2009 | Tsai | |
| 2012/0325755 A1 * | 12/2012 | Turover et al. | 210/767 |

OTHER PUBLICATIONS

International Search Report and Written Opinion of the International Searching Authority for copending Int'l App. No. PCT/US12/70137.

European Search Report and European Search Opinion for copending Int'l App. No. PCT/US12/30625.

* cited by examiner

AQUARIUM WITH A SELF-CONTAINED CLEANING APPARATUS

The present invention claims priority to U.S. Provisional Patent App. No. 61/576,420, entitled "Aquarium With a Self-Contained Cleaning Apparatus", filed Dec. 16, 2011, which is incorporated herein by reference in its entirety.

FIELD OF THE INVENTION

The present invention relates to an aquarium cleaning apparatus, and systems and methods relating to the same. In particular, a self-contained cleaning apparatus comprises a cleaning system that allows for the exchange of water in an aquarium tank by pouring water in the aquarium tank and/or pulling water out of an aquarium tank, such as via a vacuum. In a preferred embodiment, the water exchange operation occurs because of the difference between the water level of the aquarium tank, upon addition of water to the aquarium tank, and the vertical height of a spout attached to the top of a vertical tube. Therefore, it is not necessary for the user to immerse their hands in the aquarium water to operate the cleaning device.

BACKGROUND OF THE INVENTION

Aquariums are becoming increasingly popular for home and office use. An aquarium tank must be cleaned every few days to maintain an optimal water quality for the aquatic life. Water quality is affected by a number of items, such as debris from fish waste, uneaten food, dust, leftover food, all of which contribute to impurities in the aquarium water. This accumulation of debris not only makes an unsightly and undesirable appearance of the aquarium but also endangers the aquatic animals residing in the aquarium.

A typical aquarium requires a person to manually remove water and, if present, may remove aquatic creatures that require the water for survival, and vacuum a substrate, the substrate being typically comprised of gravel or rocks. The water, as noted above, contains significant impurities and debris that must be removed from the aquarium. For smaller desktop aquariums, a person may use a turkey baster to remove the debris. A user typically manually refills the aquarium tank with clean water, an amount equal to the amount of water which was removed. Cleaning an aquarium is not typically desirable because it is labor intensive and time consuming. As noted, the aquarium must be cleaned, otherwise, a dangerous situation results for the aquatic animals residing in the aquarium.

The conventional cleaning methods are not highly effective in cleaning the aquarium to an acceptable or safe level. Thus, a need exists for more efficient apparatus, systems and methods for cleaning an aquarium tank.

In addition, a need exists for aquarium tank cleaning apparatus, systems and methods that maintain and restore optimum water quality in the aquarium tank. Further, a need exists for aquarium tank cleaning apparatus, systems and methods that are easy to operate, such that a user thereof may implement the same using a one-handed operation, for example.

Moreover, a need exists for aquarium tank cleaning apparatus, systems and methods that provide for cleaning of the aquarium tank without removal of aquatic animals, rocks, plants, decorations or other like material within the aquarium tank.

Still further, a need exists for aquarium tank apparatus, systems and methods that provide for cleaning of the aquarium tank without requiring electricity or mechanical filtration. In addition, a need exists for aquarium tank apparatus, systems and methods that provide a self-contained cleaning device that is environmentally friendly and does not require the use of sophisticated and complicated technology.

SUMMARY OF THE INVENTION

The present invention relates to an aquarium cleaning apparatus, systems and methods for removing debris from the aquarium, and in particular, a self-contained cleaning apparatus that exchanges water within an aquarium tank by pouring water into the aquarium tank and/or pulling water out of an aquarium tank, such as via a vacuum. In a preferred embodiment, the water exchange operation occurs because of the difference between the water level of the aquarium tank upon addition of water to the aquarium tank and the vertical height of a spout attached to the top of a vertical tube. Therefore, it is not necessary for the user to immerse their hands in the aquarium water to operate the cleaning device.

To this end, in an embodiment of the present invention, an aquarium tank cleaning apparatus is provided. The aquarium tank cleaning apparatus comprises an aquarium tank having a top, a bottom and at least one side forming a space for holding water therein; a tube having a first end and a second end, the first end disposed proximate the bottom of the aquarium tank, the tube running vertically to a point proximate the top of the aquarium tank, wherein the second end of the tube opens at a location outside of the aquarium tank for draining water from the aquarium tank.

In an embodiment, the tube has a bend near the point proximate the top of the aquarium tank.

In an embodiment, the second end of the tube is disposed downwardly for draining water from the aquarium tank.

In an embodiment, the tube exits the aquarium tank through the side of the aquarium tank.

In an embodiment, the tube exits the aquarium tank through the side of the aquarium tank at a point proximate the top of the aquarium tank.

In an embodiment, the tube exits the aquarium tank through the top of the aquarium tank.

In an embodiment, the tube exists the aquarium tank through the side of the aquarium tank at a point proximate the bottom of the aquarium tank.

In an embodiment, the aquarium further comprises a reservoir disposed at the bottom of the aquarium tank, the reservoir for collecting debris falling to the bottom of the aquarium tank.

In an embodiment, the reservoir is funnel-shaped.

In an embodiment, the aquarium further comprises a substrate disposed over the reservoir, the substrate allowing water to flow therethrough.

In an embodiment, the substrate is a grill.

In an embodiment, the substrate comprises a plurality of rocks.

In an embodiment, the aquarium further comprises a constrictor disposed at the second end of the tube for restricting the flow of water through the second end of the tube.

In an embodiment, the first end of the tube is disposed beneath the reservoir, and further comprising an opening in the reservoir, providing passage of water therethrough into the tube.

In an embodiment, the first end of the tube is disposed above the reservoir.

In an alternate embodiment of the present invention, a method of draining water from an aquarium comprising the steps of: providing an aquarium comprising an aquarium tank having a top, a bottom and at least one side forming a space for holding water therein, a reservoir disposed proximate the bottom of the aquarium tank, and a tube having a first end and a second end, the first end disposed proximate the reservoir, the tube running vertically to a point proximate the top of the aquarium tank, wherein the second end of the tube opens outside the aquarium tank for draining water from the aquarium tank, the tank comprising a first quantity of water therein; and pouring a second quantity of water into the tank, the second quantity of water causing water to flow into the first end of the tube and out of the second end of the tube.

In an embodiment, the second end of the tube further comprises a constrictor for restricting the flow of water through the second end of the tube.

In an embodiment, the first end of the tube is disposed beneath the reservoir, and further wherein the reservoir comprises an opening providing passage of water therethrough into the tube.

In an embodiment, the first end of the tube is disposed above the reservoir.

In an embodiment, the method further comprises the steps of: collecting debris in the reservoir; and moving the debris through the tube and out of the aquarium when the second quantity of water is added to the aquarium.

Therefore, it is an objective and advantage of the present invention to provide for more efficient apparatus, systems and methods for cleaning an aquarium tank.

In addition, it is an objective and advantage of the present invention to provide aquarium tank cleaning apparatus, systems and methods that maintain and restore optimum water quality in the aquarium tank.

Further, it is an objective and advantage of the present invention to provide aquarium tank cleaning apparatus, systems and methods that are easy to operate, such that a user thereof my implement the same using a one-handed operation, for example.

Moreover, it is an objective and advantage of the present invention to provide aquarium tank cleaning apparatus, systems and methods that provide for cleaning of the aquarium tank without removal of aquatic animals, rocks, plants, decorations or other like material within the aquarium tank.

Still further, it is an objective and advantage of the present invention to provide aquarium tank apparatus, systems and methods that provide for cleaning of the aquarium tank without requiring electricity or mechanical filtration.

In addition, it is an objective and advantage of the present invention to provide aquarium tank apparatus, systems and methods that provide a self-contained cleaning device that is environmentally friendly and does not require the use of sophisticated and complicated technology.

Additional features and advantages of the present invention are described in, and will be apparent from, the detailed description of the presently preferred embodiments and from the drawings.

DETAILED DESCRIPTION OF THE INVENTION

The present invention relates to an aquarium cleaning apparatus, systems and methods, and in particular, a self-contained cleaning apparatus that utilizes a water exchange operation created by pouring water in an aquarium tank and/or pulling water out of an aquarium tank, such as via a vacuum. In a preferred embodiment, the water exchange operation occurs because of the difference between the water level of the aquarium tank upon addition of water to the aquarium tank and the vertical height of a spout attached to the top of a vertical tube. Therefore, it is not necessary for the user to immerse their hands in the aquarium water to operate the cleaning device.

Now referring to the figures, wherein like numerals refer to like parts, a self-contained aquarium tank cleaning apparatus 1 is provided. The aquarium tank cleaning apparatus 1 comprises, generally, a reservoir or funnel 10 for collecting debris disposed at or near the bottom of the aquarium tank 1, and, optionally, a substrate 12 allowably providing passage of debris down through the funnel 10. Further, the aquarium tank apparatus 1 may comprise a grill 14 for supporting the substrate 12, whereby the grill prevents the substrate from falling into the bottom of the funnel 10, an angled tube 16 connecting the funnel 10 to a vertical tube 22 at an opening in the funnel, the vertical tube 22 positioned either inside, outside (as shown in FIGS. 1-2) or within the walls of the aquarium tank 20, and a spout 24 attachably connected to the top of the vertical tube 22.

It should be noted that the aquarium tank 1 of the present invention may work with or without the reservoir or funnel 10, and the invention should not be limited as described herein. For example, the angled tube 16 may be situated to receive water from a point proximate the bottom of the tank, where the angled tube 16 may draw water therethrough. The reservoir or funnel 10 may provide the additional benefit of catching the debris and directing the debris to a suitable location to be drawn into the angled tube 16. Moreover, even though the tube 16 is referred to as an "angled" tube, it should be noted that the tube 16 may be angled or straight, or bent, or curved, and still serve the purposes described herein.

Figure 1:
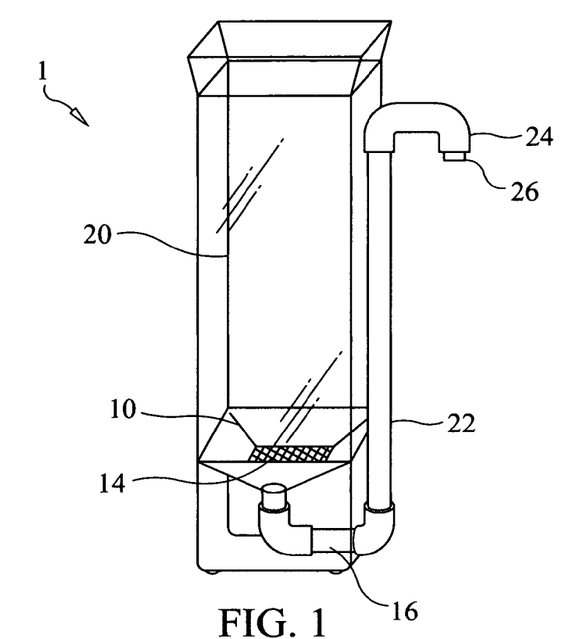
FIG. 1 is a perspective view of the aquarium self-contained cleaning apparatus showing the components of the present invention.
Figure 2:
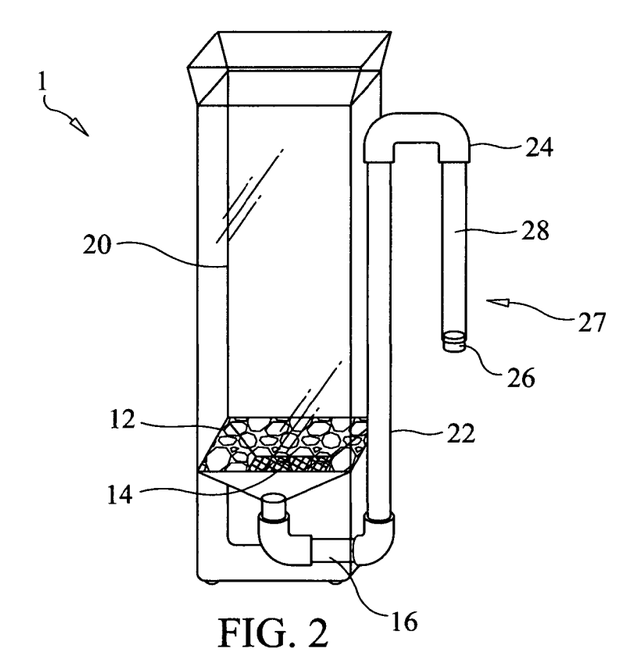
FIG. 2 is a perspective view of the aquarium self-contained cleaning apparatus of the present invention shown with a substrate.

As illustrated in FIGS. 1 and 2, the funnel 10 may have a bottom comprised of either a polygonal or circle shaped opening for collecting debris. Of course, the funnel 10 may have other shaped openings and the present invention should not be limited as provided herein. The funnel 10 preferably has a slope with an angle providing for the debris to slide down the funnel 10 to the bottom thereof. The slope of the funnel 10 in the preferred embodiment has approximately a 45-degree angle. However, it should be noted that the angle of the funnel in other embodiments may have an angle greater or less than 45-degrees, depending on or in correlation with the dimensions of the aquarium tank or any other factor apparent to one of ordinary skill in the art.

The substrate 12 may comprise gravel, rocks or other like material, and may be located within the funnel 10. However, if the substrate 12 falls to the bottom of the funnel 10, the substrate can clog the funnel, and the self-contained cleaning device may be inoperable, preventing the suction created by the pull of the water within the aquarium tank and debris through the bottom of the funnel 10. Therefore, the grill 14 may be positioned between the substrate 12, and the bottom of the funnel 10 near the opening in the bottom of the funnel 10. The grill 14 may be comprised of openings small enough to prevent the substrate 12 from falling to the bottom of the funnel 10, but may preferably be large enough to allow the debris within the aquarium tank to fall through to the bottom of the funnel 10. Preferably, the grill is present to ensure that the debris may fall past the substrate 12, such as rocks and the like, and easily removable as described herein. Without the grill 14, the waste may get stuck within the spaces between the substrate making it difficult to remove the same, as water may inconsistently flow through the spaces between the substrate. Moreover, the substrate may also contain the waste therebeneath the grill 14, and keeps the debris from moving from the bottom of the funnel 10, allowing it to remain in its location for removal thereof. The substrate may further somewhat seal the funnel therebeneath, allowing the suction created by the water exchange process to focus at the location of the bottom of the funnel 10, providing the necessary force to remove the debris therefrom during the water exchange process.

The angled tube 16 that may be positioned at the bottom of and under the funnel 10 under the opening thereof, may connect to the vertical tube 22, allowing for communication of dirty water and debris through the vertical tube 22, from the funnel 10. The angled tube 16 may be any angle allowing the debris and dirty water to be removed from the funnel 10 and traverse into and through the vertical tube 22, and may depend on the dimensions of the aquarium tank, or any other factor apparent to one of ordinary skill in the art.

The vertical tube 22 may be positioned inside the aquarium tank, built into the aquarium tank wall, or may exit the tank and traverse the outside of the aquarium tank to a position preferably proximate the top of the aquarium tank (as shown in FIGS. 1-2). The vertical tube 22 may provide for communication of the dirty water and debris removal from the angled tube 16 to the spout 24. The height of the vertical tube 22, can vary, but is limited so as to not reach the top of the aquarium tank 20.

In one embodiment of the present invention, the apparatus of the present invention provides for better protection of the aquarium tank by limiting the damage caused by outside impact. This embodiment of the present invention provides for the aquarium tank to have a more compact appearance, which may be more aesthetically pleasing. In this embodiment, where the vertical tube 22 is placed or built into the wall of the aquarium tank, an added benefit may be the advantage of lowering manufacturing costs. Alternatively, the vertical tube 22 may be disposed entirely within the inside space of the aquarium tank, and may exit the tank at a point proximate the top of the aquarium tank.

The spout 24, attaches to the top of the vertical tube 22, having a sufficient angle at an opposite end point of the spout 24 for facing downwardly to expel water and debris to the final destination of the dirty water and debris communicated through the vertical tube 22. The spout 24 can be removably connected to the vertical tube 22, providing the user the option of replacing the spout 24. The spout 24 being removably connected to the vertical tube 22 also may provide the benefit of allowing the user easy access for cleaning off any algae growing inside the vertical tube.

In a method of the present invention, the cleaning process is initiated by pouring water into the aquarium tank 20, such as in an opening at or near the top of the aquarium tank. By pouring water within the aquarium tank, a water exchange operation starts, which process typically begins when the water level of the aquarium tank 20 reaches a level above the bend in the spout 24. The water exchange process typically ends when the water level inside the aquarium tank 20 reaches a level that is in line with the end of the spout 24.

A constrictor may be an optional element of the present invention. A constrictor 26 may be positioned inside a tip of the spout 24, or a spout extension 28, as illustrated in FIGS. 2 and 7A-7C. In a preferred embodiment, the constrictor 26 may be a necessary element to ensure proper water flow, and simply reduces the diameter for the passage of water and debris therethrough. Specifically, without being bound by theory, the constrictor 26 may provide an amount of back pressure within the spout 24 and, by extension, the vertical tube 22, which may provide better flow of water through the vertical tube 22 and the spout 24. Moreover, the constrictor 26 may allow for a cleaner cut-off of water flow when the water level within the aquarium tank 20 reaches the same level as the vertical height of the end of the spout 24.

Figure 7A:
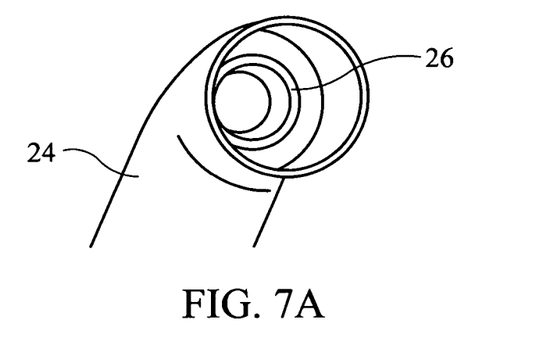
FIGS. 7A, 7B and 7C illustrate embodiments of constrictors disposed internally within and externally outside of a spout in embodiments of the present invention.
Figure 7B:
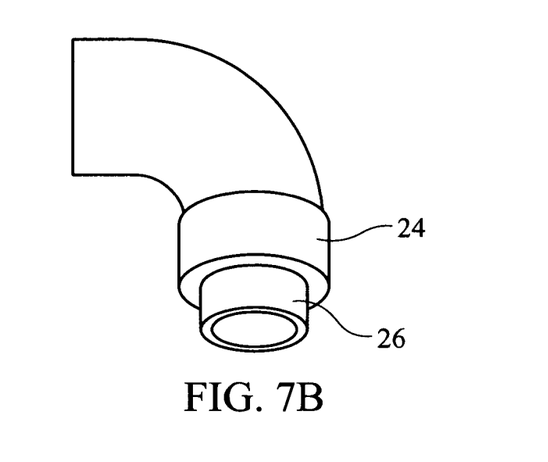
Figure 7C:
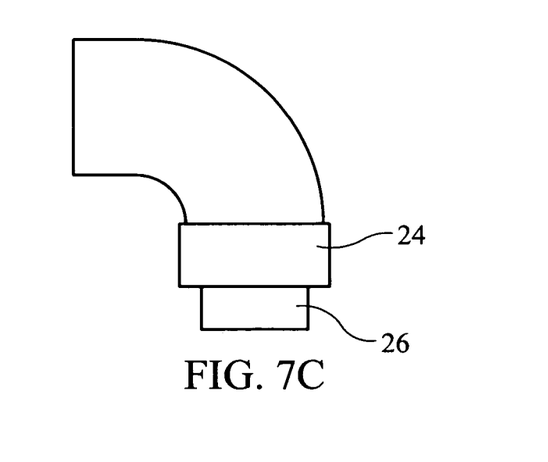
Figure 8:
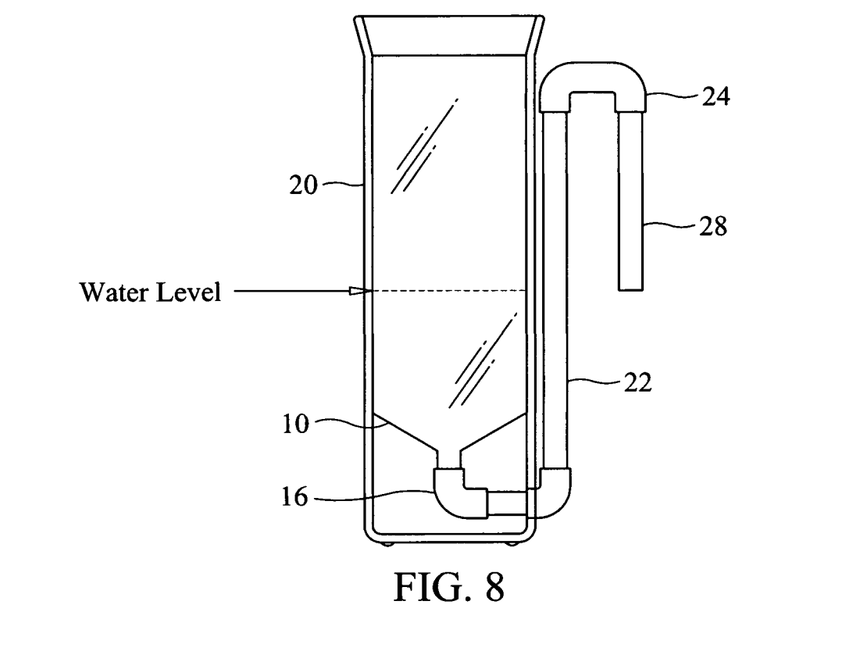
FIG. 8 shows a view of the automatic shut-off mechanism utilizing a spout extension to terminate the siphoning process.

As detailed above, the constrictor 26 may be positioned internally within the spout 24, as shown in FIG. 7A. In a more preferred embodiment, the constrictor 26 may be positioned externally to the spout 24, such as being attached to the end of the spout 24, or otherwise extending out of the spout 24, as illustrated in FIGS. 7B and 7C. A more consistent flow and cleaner cut-off of water is generally seen by utilizing the constrictor outside the spout 24 or otherwise extending outside the spout 24. As shown in FIGS. 7A-7C, the constrictor may preferably be made of rubber, plastic, or any other material apparent to one of ordinary skill in the art. Preferably, the constrictor 26 may be made of rubber, and may fit tightly in the spout 24 and/or extend therefrom. Generally, the constrictor 26 and may fit within the spout 24, as shown in FIG. 7A, or extend outside the spout 24, as shown in FIGS. 7B-7C. The constrictor 26 may be positionably adjusted depending on whether the spout extension 28 is utilized, as illustrated in FIGS. 2 and 8. Alternatively, the constrictor 26 may be integrally formed as part of the spout 24 or spout extension 28.

Figure 3:
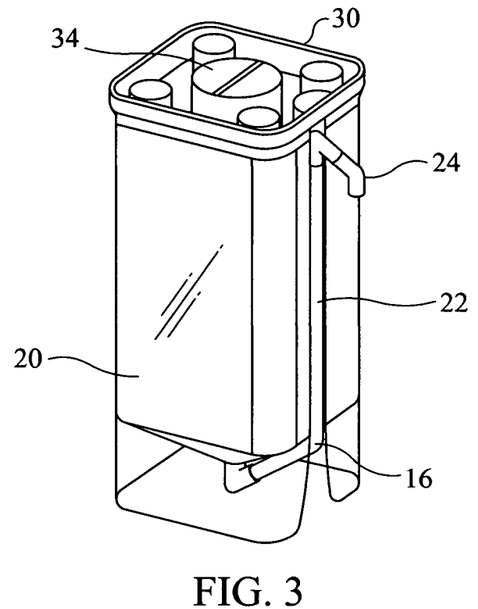
FIG. 3 is a perspective view of the aquarium self-contained cleaning apparatus of the present invention, having a lid with lighting.
Figure 4:
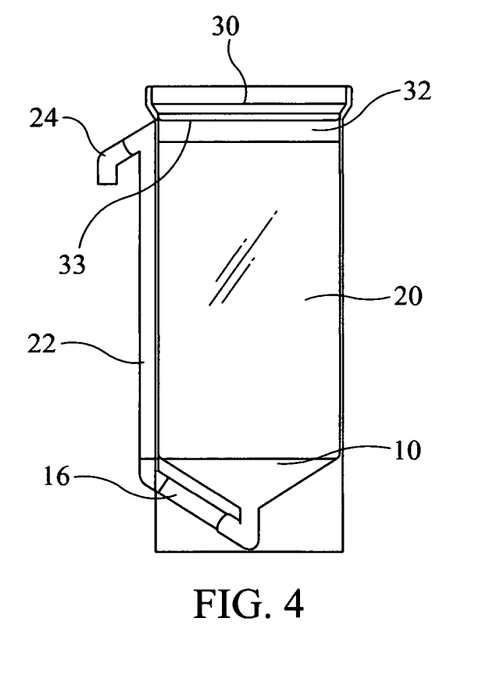
FIG. 4 is a cross-sectional view of the aquarium self-contained cleaning apparatus of the present invention, having a lid with lighting.

The spout extension 28 may be attachable to the spout 24, creating a spout assembly 27. The spout assembly 27 may provide for a greater amount of water removal from the aquarium tank. A user may then be required to manually refill the aquarium tank to the optimum level, if desired Referring now to FIGS. 3 and 4, the present invention is illustrated, showing the self-contained cleaning apparatus 1, having a lid 30. The lid, when securely attached to the aquarium top, or restably positioned inside the flared top of the aquarium tank, may prevent aquatic animals from jumping out of the aquarium tank 20. The lid 30 may have a plurality of openings (not shown) for the passage of oxygen to and from the aquatic environment and may allow both the exchange of oxygen and the entrance of light. The openings further may provide a passageway for communication of water to the aquarium tank 20, such as via an opening 34. Removal of said lid may, therefore, not be necessary, in a preferred embodiment of the present invention. The openings may be vertically and horizontally aligned to allow lighting 32, preferably waterproof LED lights that may be securely attached on the underside 33 of said lid 30, the lights illuminating the aquarium tank 20. In an alternate embodiment, an LED light-emitting apparatus may be disposed atop a lid and may shine light downwardly into the aquarium tank. Specifically, the lid may have holes to allow light to shine therethrough from the LED light-emitting apparatus, or may be transparent or translucent to allow light from the LED light-emitting apparatus to shine light therethrough.

Figure 5:
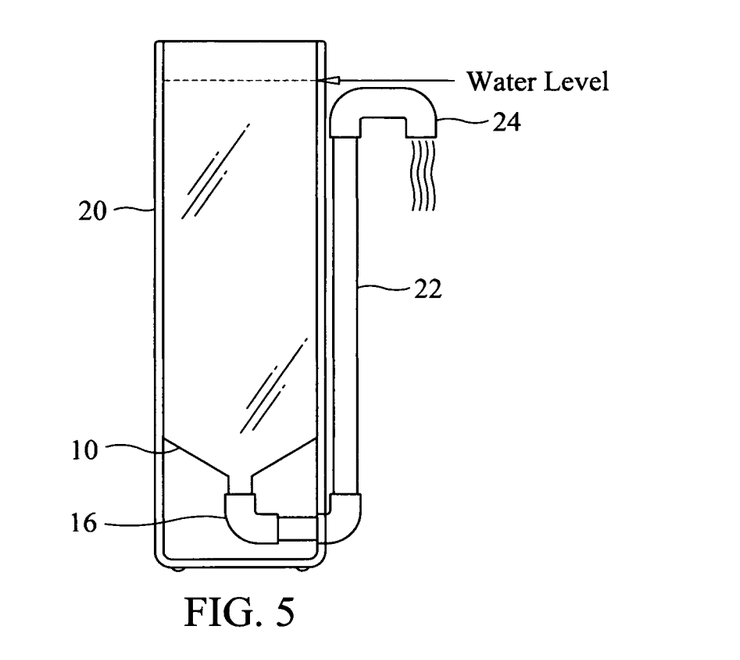
FIG. 5 shows a view of the initiation of the water exchange process, the water exchange process occurring when the water level of the aquarium tank exceeds the level of the bend in the spout. The initiation of the water exchange process starts when water is poured into the aquarium tank.
Figure 6:
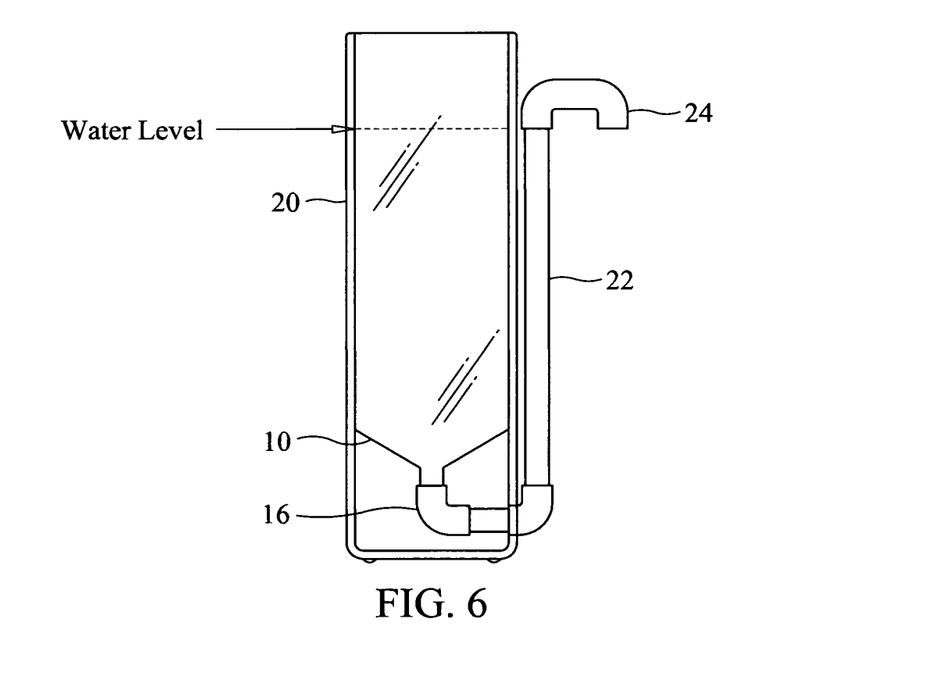
FIG. 6 shows a view of the automatic shut-off mechanism ending the siphoning process.

Referring to FIGS. 5 through 8, a method of operation of the present invention, the self-contained cleaning apparatus 1, will now be described. As shown in FIG. 5, clean water may be poured into the aquarium tank 20; a water exchange process may begin when the water level in the aquarium tank 20 reaches a level greater or higher than the bend in the spout 24, thereby pulling the water and debris from the bottom of the funnel 10. The water exchange process created may help deliver the water and debris through the angled tube 16, the vertical tube 22, and the spout 24 (and the optional spout extension 28, if used). The water and debris may be removed through the spout 24, and the spout extension 28 (if connected), until the water flow stops. As shown in FIG. 6, siphoning may automatically stop when the water level in the aquarium tank 20 equilibrates at the same height as the tip of the spout. FIG. 7 shows the same removal process when the spout extension 28 is used.

As shown in FIG. 5, the water exchange process may be started when a user pours water into the aquarium tank 20, before the water reaches the very top of the aquarium tank 20. As shown in FIG. 6, the flow of water generally automatically stops when the water level in the tank 20 equilibrates at the same vertical height as the end of the spout 24.

The present invention provides a number of advantages over the prior art. Operation of the present invention can be by a single hand, for example, by simply pouring water from a container into the aquarium tank 20. The present invention further may prevent debris from being scattered over the aquarium. The present invention may only require a primer for starting the cleaning process, such as when the user adds water to the aquarium tank 20, and the water level inside the tank 20 reaches a level above the angle bend of the spout 24. The spout 24 may be attached to the top of the vertical tube 22. The angled tube 16, the vertical tube 22, and the spout 24 may be connected to the aquarium tank by the user.

Moreover, the user need not immerse their hands in the aquarium tank with the present invention to start the cleaning process. Optimum water level can be restored and maintained quickly. Optimum water level is defined as the water level necessary to maintain the life of the aquatic animals and clean the aquarium tank without their removal. Having the ability to maintain the aquatic environment with the optimum water level also provides an aesthetically pleasing appearance. Electricity and many of the elements required in current and prior mechanical filters are not required to clean the aquatic environment with the use of the present invention. The present invention is not only environmental friendly, but it does not require the use of any complex technology. The self-contained cleaning device can be manufactured by the use of injection molding machinery, or manufactured from glass with the appropriate technology.

Figure 9:
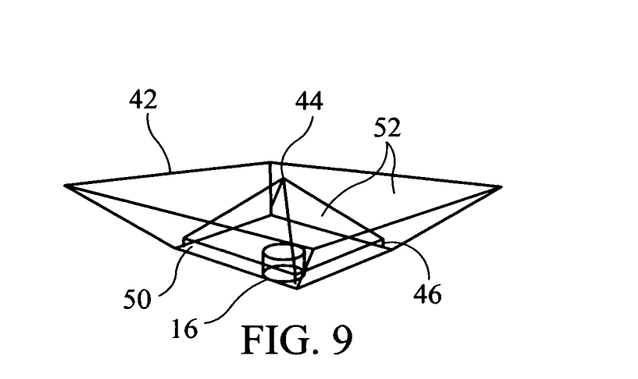
FIG. 9 shows a perspective view of a funnel having a low profile requiring less vertical space in the aquarium tank.
Figure 10:
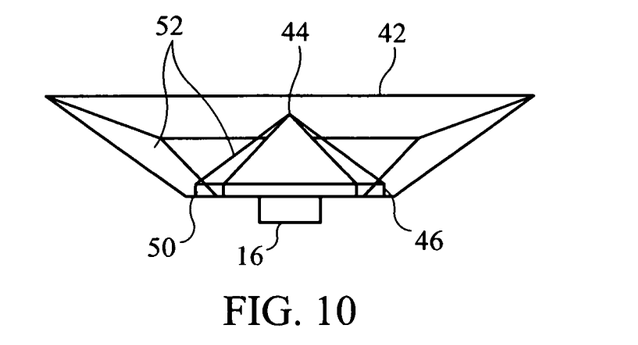
FIG. 10 is a planar view of a funnel having a low-profile.
Figure 11:
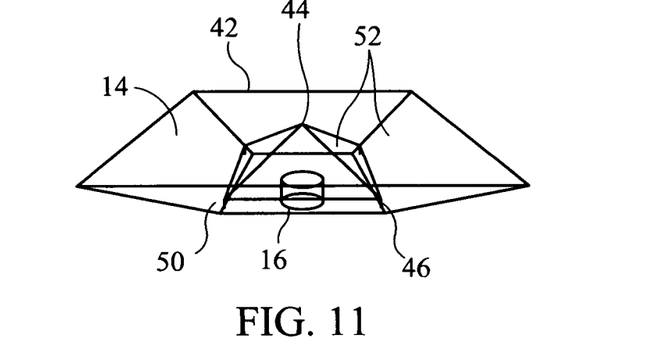
FIG. 11 is a perspective view of a funnel having a low profile where the grill 14 has been installed.

An alternate "low-profile" funnel is shown in FIGS. 9, 10 and 11. In this embodiment, the low-profile funnel may permit the funnel to require less space in the aquarium tank 20. The funnel having a low profile is comprised of a plurality of components, such as, preferably, a basin 42 and a cone 44. A plurality of slopes 52 may be created by said components. Said slopes 52 may aid in allowing the funnel a low-profile. The cone 44 may be located on top of the middle of the basin 42 and may be supported by legs 46, which may create a small gap between the solid bottom of the cone 44 and the basin 42. An opening may be positioned in the middle of a basin 42. The angled tube 16 may be positioned beneath the opening connected to the funnel and may connect to the vertical tube 22. The water exchanged process may be initiated either through a pump or when water is pulled from the basin 42 through the angled tube 16, such as if water is added to the aquarium tank 20, and then removed from the aquarium tank 20 by the same methods as described above with respect to the other embodiments. The bottom of the cone 44 may be solid and the gap between the basin 42 and the cone 44 may be small such that the velocity of water flow at the collection point 50 may be increased relative to a larger opening. The collection point 50 may be formed on the bottom of the basin 42 where the individual slopes 52 of the basin 42 and cone 44 are closest to each other. The collection point 50 and plurality of slopes 52 may typically be where the debris collects within the funnel having a low-profile. Much of the debris that slides down the slopes 52 into the collection point 50 or rests on the slopes 52 may be flushed out of the tank during the siphoning process. In this embodiment the grill 14 may be suspended by resting on top of the slopes 52 created by the basin 42 and the cone 44.

If a larger aquarium tank is utilized or an alternate shape of an aquarium tank is desired, the following embodiment provides one option for the user to utilize the present invention. The present invention can be utilized for a larger aquarium tank by utilizing multiple connecting funnels (not shown). The multiple connecting funnels may be positioned at or near the bottom of the aquarium tank. Preferably, the distance of the vertical tube to each funnel may be equidistant to assure that each funnel gets the same rate of flow. Multiple connecting funnels can be connected together at a single joining spout (not shown).

Figure 12:
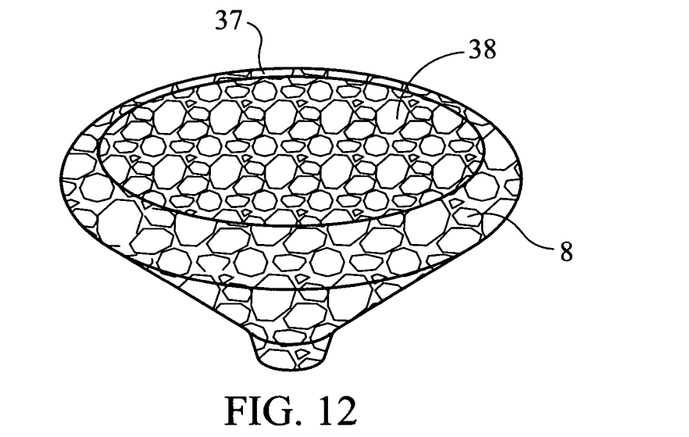
FIG. 12 is a perspective view of a decorative funnel of the present invention.

An alternate funnel is illustrated in FIG. 12. Specifically, a decorative funnel insert 37, ("DFI"), may be an optional element of the present invention. The DFI 37 can be used for either decorative or functional purposes or both. The DFI 37 may be utilized for decorative appearance in the aquarium tank 20 and may appear as a natural layer of gravel 8, throughout the bottom of the aquarium tank 20. The gravel 8 may be located between the plurality of smooth walls 38 of the decorative funnel insert 37. The plurality of smooth walls 38 of the decorative funnel insert 37 may function as an empty pocket, holding the gravel, (or a preferred decorative substrate) within the plurality of smooth walls 38 of the decorative funnel insert 37. The DFI 37 may be inserted so that it fits inside of, or nests within an existing funnel 10, whereby the substrate 12 and grill 14 are removed. The grill 14 may then be installed onto the decorative funnel insert 37.

The DFI 37 may provide for a number of desirable features. The DFI 37 may result in a cleaner and healthier aquarium. No debris may stick in the gravel 8. The debris may slide down the plurality of smooth walls 38 positioned in the DFI 37. The plurality of smooth walls 38 in the DFI 37 may provide for clear communication of the debris to the outside of the aquarium. The appearance of the aquarium tank may be enhanced because the green algae will not grow in the gravel 8. The gravel 8 is preferably encapsulated within the plurality of smooth walls 38 of the DFI37. In a preferred embodiment, the aquarium tank 20 may have a variable appearance catered to the preferred uniqueness of the user. The user may choose different color patterns and designs of the DFI 37. The DFI37 may save the user time from the cleaning process because there is no need to remove gravel 8 out of the aquarium tank 20 to scrub algae off the gravel.

FIGS. 13-18 illustrate an alternate preferred embodiment of the present invention of a self-contained cleaning apparatus 100 for cleaning an aquarium tank 120. The apparatus 100 comprises a reservoir 110 disposed at or near the bottom of the aquarium tank 120 for collecting debris that may be generated or that may otherwise appear in the aquarium tank 120. The reservoir 110 may function, generally, similarly to the funnel 10 disclosed above. Specifically, the reservoir may have a depression with angled sides for holding debris that may fall thereinto. In addition, the apparatus 100 may contain a grill 114 disposed over the reservoir 110 for holding and supporting a substrate 112, such as gravel, rocks, or other like material, wherein the grill 114 prevents the substrate 112 from falling to the bottom of the reservoir 110.

Disposed above the reservoir 110 may be an open-ended angled tube 116, the open end facing downwardly over a collection point 150 on the reservoir. Preferably, there is a gap between the open end of the angled tube 116 and the collection point 150. The opposite end of the angled tube 116 may be interconnected to a vertical tube 122, which may run vertically to a position proximate the top of the aquarium tank 120. The vertical tube 122 may run inside or outside the aquarium tank 120, or may be integrally formed within a sidewall of the aquarium tank 120. The vertical tube 122 may terminate at the position proximate the top of the aquarium tank, where a spout 124 may be attachably connected thereto. Preferably, if the vertical tube 122 runs vertically within the aquarium tank 120, the spout 124 may run through a grommet 131, and the end of the spout 124 opposite to the end connected to the vertical tube 122 may be disposed downwardly for draining water and debris from the aquarium tank 120 when in operation. The substrate 112, which may be supported by the grill 114, may cover the angled tube 116 thereby rendering the angled tube 116 difficult to detect by a viewer.

Figure 13:
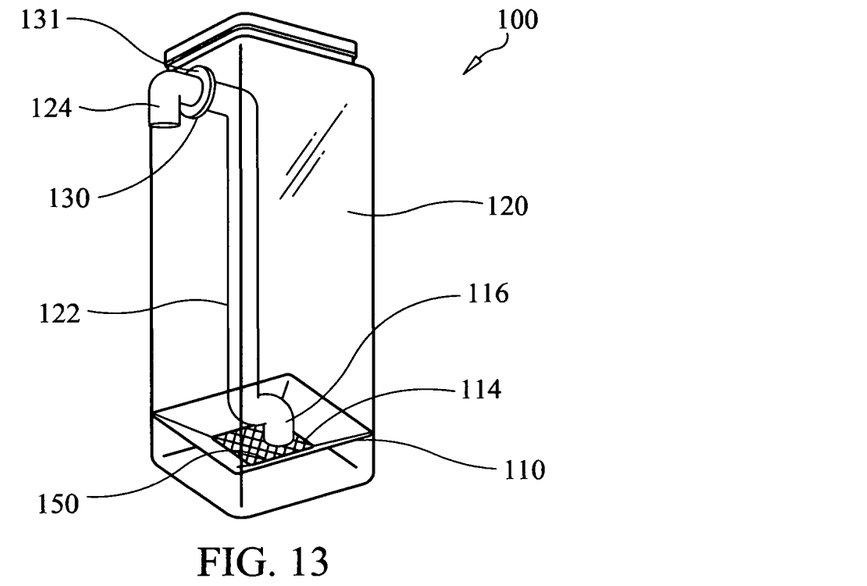
FIG. 13 illustrates a perspective view of an aquarium tank cleaning apparatus in an alternate embodiment of the present invention.
Figure 14:
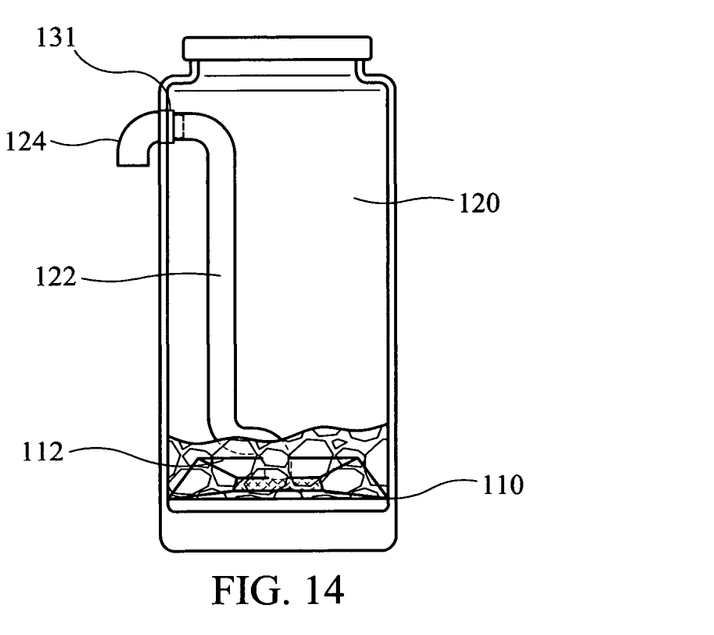
FIG. 14 illustrates a side view of an aquarium tank cleaning apparatus with substrate therein in an embodiment of the present invention.
Figure 18:
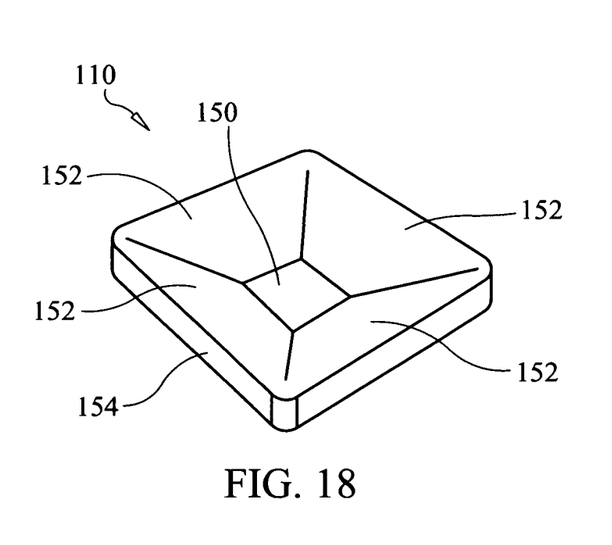
FIG. 18 illustrates a perspective view of a reservoir for collecting debris within an aquarium tank in an embodiment of the present invention.

FIGS. 13 and 14 illustrate perspective views of the aquarium self-contained cleaning apparatus 100 of the present invention. Referring to FIG. 18, a perspective view of the reservoir 110 is shown. The reservoir 110 may have slopes 152, each with an angle providing for the debris to slide down the slopes 152 to the collection point 150 of the reservoir 110. The slopes 152 of the reservoir 110, in the preferred embodiment, each has approximately a 45 degree angle. However, it should be noted that the angle of the slopes in other embodiments may be greater or less than 45-degrees, depending on or in correlation with the dimensions of the aquarium tank, or for any other reason apparent to one having ordinary skill in the art. The reservoir 110 may be manufactured as an individual piece to be inserted into the aquarium tank, as shown in the figures, or may be molded directly with the aquarium tank (not shown). A reservoir wall 154, as illustrated in FIG. 18, may optionally be present to provide stability to the reservoir.

The substrate 112 may comprise gravel or rocks, and the substrate may be located above the reservoir 110, as described above. If the substrate 112 falls to the bottom of the reservoir 110, the substrate can block water flow, causing the self-contained cleaning apparatus 100 function improperly, preventing the suction created by the water exchange process (when in operation as described below) from pulling the water and debris from the bottom of the reservoir 110.

Moreover, the grill 114 may be positioned between the substrate 112, and the bottom of the reservoir 110. The grill may be comprised of openings small enough to prevent the substrate 112 from falling to the bottom of the reservoir 110, but may be large enough to allow the debris to fall through to the bottom of the reservoir 110.

In addition, as described above, the angled tube 116 may have one end positioned facing downward and may be positioned to have its open end held in place above the center of the reservoir 110. The opposite end of the angled tube 116 may connect to the vertical tube 122, allowing for communication of dirty water and debris through the vertical tube 122 from the reservoir 110. The angle of the angled tube 116 may be an angle allowing the angled tube 116 to be positioned such that the open end faces downwardly, but is connected to the vertical tube 122. Specifically, an array of angles may be utilized for the angled tube 116 allowing the angled tube 116 to be connectably available to the vertical tube. The angle of the angled tube 116 may depend on the dimensions of the aquarium tank for water removability, or for any other reason apparent to one of ordinary skill in the art.

The gap between the floor of the reservoir 110 and the open end of the angled tube 116 may be relatively small, so the water that may flow into the angled tube 116 at the collection point 150 may be relatively rapid. The collection point 150 may be formed on the floor of the reservoir 110 where the individual slopes 152 of the reservoir 110 are closest to each other. The collection point 150 and plurality of slopes 152 may be where the debris may collect within the reservoir 110. Much of the debris that slides down the slopes 152 into the collection point 150 or rests on the slopes 152 may be flushed out of the tank during the water exchange process. In this embodiment the grill 114 may be disposed above the reservoir 110 by resting on the reservoir 110.

It should be noted that the reservoir 110 (as well as the reservoir 10, described above), may preferably be fit tightly within aquarium tank 120 such that the debris that may collect within the aquarium tank may be contained within the reservoir 110 (or 10) and not beneath the reservoir 110 or in between the reservoir 110 and the sides of the aquarium tank 120. More preferably, the top of the reservoir 110 is fit tightly or even sealed to the sides of the aquarium tank 120 to prevent debris from falling beneath the reservoir 110 or between the reservoir 110 and the sides of the aquarium tank 120. Moreover, the reservoir 110 may be integrally formed as a component of the aquarium tank 120 to prevent the debris from falling beneath or the sides of the reservoir 110.

A decorative reservoir (not shown) may be an optional element of the present invention. A decorative reservoir may be used for either decorative or functional purposes or both. A decorative reservoir may be utilized for decorative appearance in the aquarium tank 120 to appear as a natural layer of gravel throughout the bottom of the aquarium tank 120. The gravel may be located between, for example, a plurality of smooth walls of the decorative reservoir. The plurality of smooth walls of the decorative reservoir may function as an empty pocket, holding the gravel, (or a preferred decorative substrate) within the plurality of smooth walls of the decorative reservoir.

The vertical tube 122 may be positioned inside the aquarium tank (as shown in FIGS. 13-17, outside the aquarium tank or built into the aquarium tank wall. The vertical tube 122 generally allows for communication of the dirty water and debris from the angled tube 116, through the vertical tube 122 to the spout 124. The height of the vertical tube 122 may vary, but is typically limited so as to not reach the top of the aquarium tank 120.

In an alternative embodiment, the vertical tube 122 may extend upwardly through the top of the aquarium tank, and then downwardly outside the tank, with the bend above the top of the tank. In such a situation, a siphon may be created by applying a vacuum on the outside end of the tube, thereby drawing water upwardly and out of the aquarium tank. However, care should be taken to ensure that the entirety of the water is not removed, or if it is removed, that a quantity of water is added after the siphon process has ceased to replenish the water contained therein.

A spout 124 may be attached to the top of the vertical tube 122, having a sufficient angle for providing the opposite end point that is not connected to the vertical tube 122 to face, generally, downwardly, the final destination for the dirty water and debris communicated through the vertical tube 122. Said spout 124 may be removably connected to the vertical tube 122, providing the user the option of replacing the spout 124, if necessary. The spout 124, being removably connected to the vertical tube 122, provides the benefit of allowing the user easy access for cleaning off any algae growing inside the vertical tube 122. The spout 124 may connect to the vertical tube 122 through a hole proximate the top of the aquarium tank 120. The grommet 131 may be used to prevent leaking around a hole 130 in the side of the aquarium tank 120.

The cleaning process, as illustrated herein, may be initiated by pouring water into the aquarium tank 120 while the aquarium is already filled with water. The water exchange process may begin when the water level of the aquarium tank 120 reaches a level above the bend in the spout 124. The process may terminate when the water level of the aquarium tank 120 reach a level of the end of the spout 124.

Figure 17:
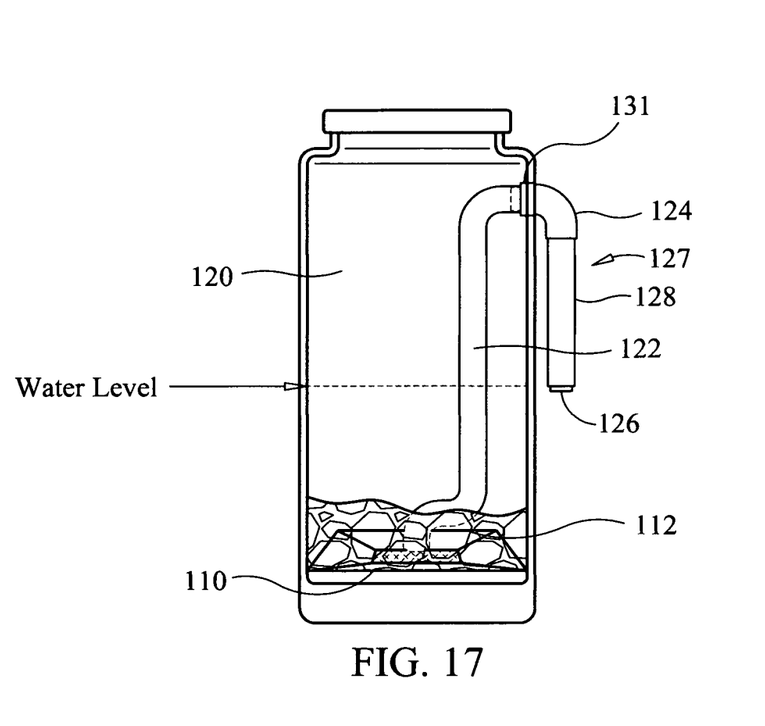
FIG. 17 illustrates a side view of an aquarium tank cleaning apparatus showing a water line level with a spout extended in an embodiment of the present invention and a constrictor for aiding in stopping the water exchange process.

A constrictor may be an optional element of the present invention, as described above with reference to FIGS. 7A-7C. As with the previous embodiment, the constrictor may be positioned inside the spout 124, or a spout extension 128, as illustrated in FIG. 17, or may be positioned outside the spout 124, or otherwise extending from the spout 124. Preferably, the constrictor may be a necessary element to ensure proper water flow for siphoning when in operation. The constrictor may be positionably adjusted depending on whether the spout extension 128 is utilized.

The spout extension 128 may be attachable to the spout 124, creating a spout assembly 127. The spout assembly 127 provides for a greater amount of water removal from the aquarium tank. If the spout assembly 127 is utilized, a user would be required to manually refill the aquarium tank 120 to the optimum level if desired. The spout extension 128 may alternately be integrally formed with the spout 124, but preferably the spout extension 128 is removable to provide a user the option of using only the spout 124 or the spout extension 128.

Figure 15:
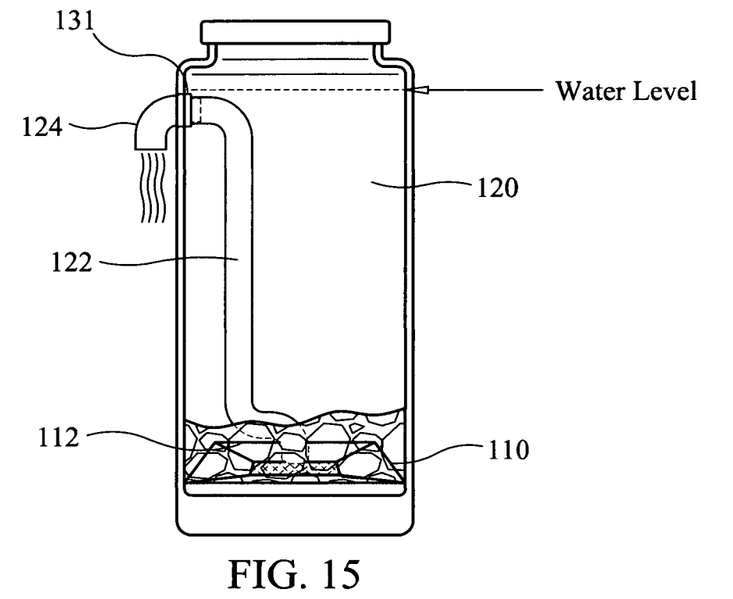
FIG. 15 illustrates a side view of an aquarium tank cleaning apparatus showing a water line near the top of the aquarium tank in an embodiment of the present invention.
Figure 16:
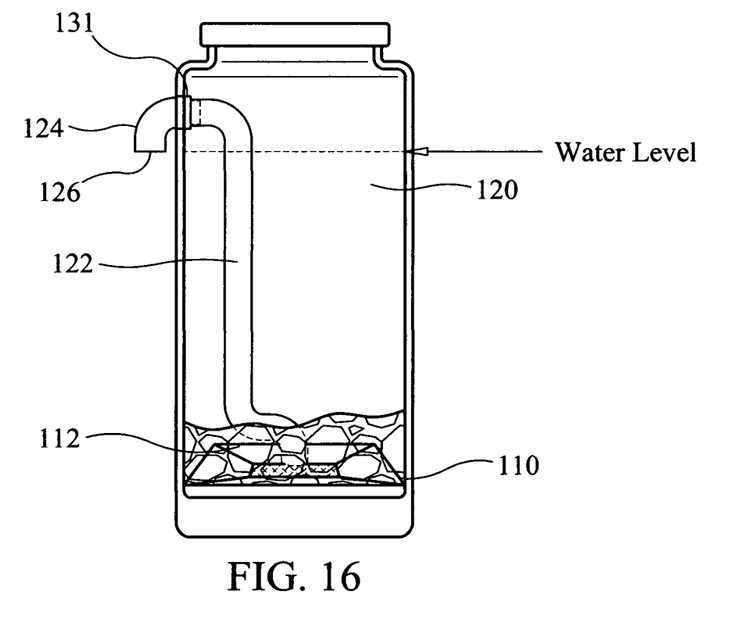
FIG. 16 illustrates a side view of an aquarium tank cleaning apparatus showing a water line level with the spout in an embodiment of the present invention.

Referring to FIGS. 15 through 17, the operation of the present, invention, the self-contained cleaning apparatus 100, is shown. As shown in FIG. 15, water may be poured into the aquarium tank 120 and a water exchange process may be started when the water level in the aquarium tank 120 reaches a level greater or higher than the bend in the spout 124, thereby pulling the water and any debris from the bottom of the reservoir 110. The water exchange process may help deliver the water and debris through the angled tube 116, the vertical tube 122, and the spout 124 (and the optional spout extension 128 if used). The water and debris may be removed through the spout 124, and the spout extension 128 (if connected), until the water flow stops. As shown in FIG. 16, water flow may automatically stop when the water level in the aquarium tank 120 equilibrates at the same height 126 as spout 124 or the constrictor recessed inside the spout 124. FIG. 8 shows the same removal process when the spout extension 128 is used, with the water level in the aquarium tank equilibrating at the same height as the open end of the spout extension 128.

The present invention provides a number of advantages over the prior art. Operation of the present invention is typically easy and efficient. For example, the operation may be accomplished by a user using a single hand. The present invention further may prevent debris from being scattered over the aquarium. The present invention only requires a primer for starting the cleaning process, as the cleaning process is started when the user adds water to the aquarium tank 120, and the water level inside the tank 120 reaches a level above the angle bend of the spout 124.

Further, the user need not immerse his or her hands in the aquarium tank 120 to start the cleaning process. Optimum water level may be restored and maintained quickly. Optimum water level is generally defined as the water level necessary to maintain the life of the aquatic animals and clean the aquarium tank without their removal or removal of other material from the aquarium tank 120. Having the ability to maintain the aquatic environment with the optimum water level may also provide an aesthetically pleasing appearance. Electricity and many of the elements required in current and prior mechanical filters are generally not required to clean the aquatic environment with the use of the present invention. The present invention is not only environmental friendly, but typically does not require the use of any complex technology. The self-contained cleaning device may be manufactured by the use of injection molding, blow molding, or thermo-forming machinery, or constructed from glass, for example.

The present invention has been described in detail and illustrated in the drawings, with reference to different embodiments, however, the present invention is not limited to the specific embodiments described, and those knowledgeable in the prior art will not only appreciate the details of the present invention, but will understand the ability to further modify the present invention.

The invention claimed is:

1. An aquarium comprising: an aquarium tank having a top, a bottom and at least one side forming a space for holding water therein; a tube having a first end, a first diameter, and a second end, the first end disposed at a point proximate the bottom of the aquarium tank, the tube running inside the aquarium tank from the point proximate the bottom of the aquarium tank to a point proximate the top of the aquarium tank, wherein the tube runs through the at least one side and below the top of the aquarium tank, further wherein the second end of the tube opens downward at a location outside of the aquarium tank for draining water from the aquarium tank; and a constrictor disposed within the second end of the tube for regulating the flow of water through the second end of the tube, the constrictor having a second diameter smaller than the first diameter of the tube.

2. The aquarium of claim 1 wherein the tube has a bend near the point proximate the top of the aquarium tank.

3. The aquarium of claim 1 further comprising:
a reservoir disposed at the bottom of the aquarium tank, the reservoir for collecting debris falling to the bottom of the aquarium tank.

4. The aquarium of claim 3 wherein the reservoir is funnel-shaped.

5. The aquarium of claim 3 further comprising:
a substrate disposed over the reservoir, the substrate allowing water to flow therethrough.

6. The aquarium of claim 5 wherein the substrate is a grill.

7. The aquarium of claim 5 wherein the substrate comprises a plurality of rocks.

8. The aquarium of claim 3 wherein the first end of the tube is disposed beneath the reservoir, and further comprising:
an opening in the reservoir, providing passage of water therethrough into the tube.

9. The aquarium of claim 3 wherein the first end of the tube is disposed above the reservoir.

10. A method of draining water from an aquarium comprising the steps of:
providing an aquarium comprising an aquarium tank having a top, a bottom, at least one side forming a space for holding water therein, and a first quantity of water therein ending at a first water level, a reservoir disposed proximate the bottom of the aquarium tank, and a tube having a first end, a first diameter, and a second end, the first end disposed proximate the reservoir, the tube running inside the aquarium tank to a point proximate the top of the aquarium tank, wherein the tube runs through the at least one side above the first water level and below the top of the aquarium tank, further wherein the second end of the tube has an opening outside the aquarium tank, wherein the opening is disposed downwardly and approximately at the first water level for draining water from the aquarium tank, and a constrictor disposed within the second end of the tube for regulating the flow of water through the second end of the tube, the constrictor having a second diameter smaller than the first diameter of the tube; and
pouring a second quantity of water into the first quantity of water inside the aquarium tank to a second water level, wherein the second water level is above the second end of the tube, the second quantity of water causing water to flow into the first end of the tube and out of the second end of the tube and stops automatically when the water in the tank returns to the first water level.

11. The method of claim 10 wherein the first end of the tube is disposed beneath the reservoir, and further wherein the reservoir comprises an opening providing passage of water therethrough into the tube.

12. The method of claim 10 wherein the first end of the tube is disposed above the reservoir.

13. The method of claim 10 further comprising the steps of:
collecting debris in the reservoir; and
moving the debris through the tube and out of the aquarium when the second quantity of water is added to the first quantity of water inside the aquarium tank.

14. An aquarium comprising: an aquarium tank having a top, a bottom and at least one side forming a space for holding water therein; a tube having a first end, a first diameter, and a second end, the first end disposed at a point proximate the bottom of the aquarium tank, the tube running inside the aquarium tank from the point proximate the bottom of the aquarium tank to a point proximate the top of the aquarium tank, wherein the tube runs through the at least one side below the to of the aquarium tank to a location outside of the aquarium tank, further wherein the second end of the tube comprises a constrictor having a second diameter, wherein the second diameter of the constrictor is smaller than the first diameter of the tube.

15. The aquarium of claim 14 wherein the second end of the tube opens downwardly.

16. The aquarium of claim 14 further comprising:
a reservoir disposed at the bottom of the aquarium tank, where the reservoir collects debris falling to the bottom of the aquarium tank.

17. The aquarium of claim 16 further comprising:
a substrate disposed over the reservoir, wherein the substrate allows water to flow therethrough.

18. The aquarium of claim 16 wherein the constrictor is disposed within the second end of the tube for regulating the flow of water through the second end of the tube.

19. The aquarium of claim 18 wherein the constrictor extends a length outside the second end of the tube.

* * * * *